SELF-ADJUSTING PLIER-TYPE TOGGLE LOCKING WRENCH

Original Filed Feb. 26, 1962 2 Sheets-Sheet 1

INVENTOR.
J. L. HOSTETTER
BY Frank A. Steiger
Agent

SELF-ADJUSTING PLIER-TYPE TOGGLE LOCKING WRENCH

Original Filed Feb. 26, 1962 2 Sheets-Sheet 2

INVENTOR.
J. L. HOSTETTER
BY Hiram A. Sturges
Agent

United States Patent Office

Re. 26,280
Reissued Oct. 17, 1967

26,280
SELF-ADJUSTING PLIER-TYPE TOGGLE LOCKING WRENCH

John L. Hostetter, Murray, Nebr. 68409

Original No. 3,116,656, dated Jan. 7, 1964, Ser. No. 175,441, Feb. 26, 1962. Application for reissue Jan. 6, 1966, Ser. No. 536,932
7 Claims. (Cl. 81—379)

Matter enclosed in heavy brackets [ ] appears in the original patent but forms no part of this reissue specification; matter printed in italics indicates the additions made by reissue.

*ABSTRACT OF THE DISCLOSURE*

*The wrench described in the following disclosure is constructed to firmly and securely grip an object of any size or thickness, within predefined limits, with substantially the same amount of pressure, with the jaws of the wrench automatically remaining in a locked condition, and wherein due to a toggle linkage arrangement, the grip of the wrench may be quickly and easily released.*

This invention relates to self-adjusting plier-type toggle locking wrenches and more particularly it is an object of this invention to provide a wrench of this type which further has means for automatically adjusting the wrench proportional to the size of a work piece engaged therewith whereby a thick or thin work piece can be consecutively engaged by the wrench without the necessity of adjusting the wrench for the size of the work piece.

A further object is to provide an improvement on the wrench of my earlier patent, No. 2,751,801, titled, Self-Adjusting Plier-Type Toggle Locking Wrench, issued June 26, 1956.

A further object is to provide a self-adjusting wrench the lower jaw of which can be of a conventional type used in non-self-adjusting toggle wrenches whereby the head of the wrench can be relatively small as measured transversely across the rearward end of the movable jaw for insertion into tight places with greater ease than is possible when the movable jaw must have a linkage attachment protrusion on the opposite side of its main pivot from its movable handle connection.

A further object is to provide a self-adjusting wrench the parts of which are less critical in their dimensions whereby they can be manufactured without the need of as close tolerances for gaining a perfected operation, thereby providing a more inexpensive manufacturing cost.

A further object is to provide a self-adjusting wrench needing fewer parts.

Another object is to provide a self-adjusting wrench, a pressure adjusting screw of which is disposed in a position that is easily accessible and which does not cause extra expense in cutting out or notching the main handle in order to provide access to the pressure adjusting screw.

A particular object is to provide a more inexpensive wrench with operating perfection which achieves self-adjustment for size whereby a size adjustment screw is eliminated and only a pressure adjustment screw is used, necessity for operating the latter being so much less frequent than for adjusting a size adjustment screw of the prior art that a wrench is provided that can be operated with great speed.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 2:
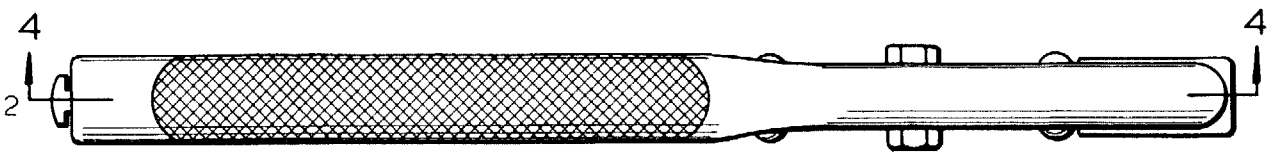
FIGURE 2 is a top plan view of the wrench of FIGURE 1.
Figure 1:
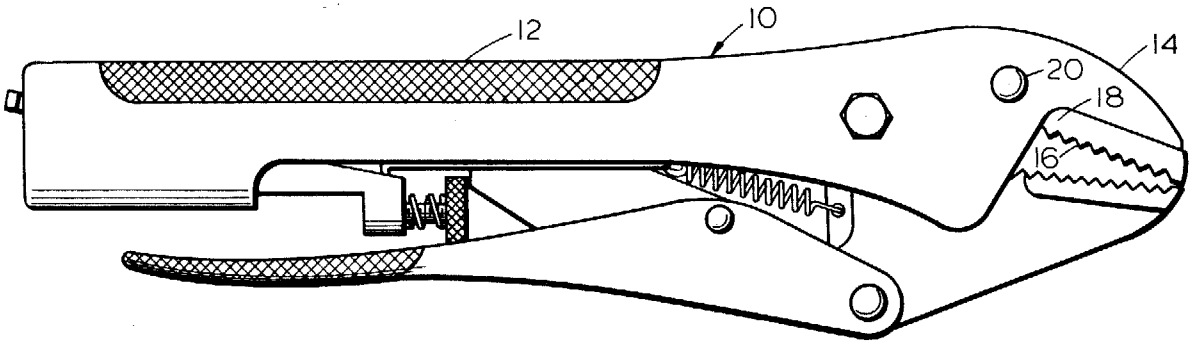
FIGURE 1 is a side view of the wrench of this invention shown in closed position.
Figure 3:
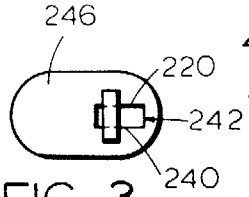
FIGURE 3 is a left end view of the wrench of FIGURE 2.

Referring to the drawings, it will be seen that this invention is a toggle wrench generally indicated at 10 having an elongated first handle 12 forming a body portion of the wrench and provided at its forward end with a stationary jaw 14 having teeth 16 on its jaw piece 18 secured to the handle 12 by a rivet 20.

The handle 12 is formed with an elongated recess 20 therein. A co-acting movable jaw 30 is pivoted to the handle of portion 12 by means of a pivot pin 34, and the jaw 30 is partially received in the recess 20 in a conventional manner.

The handle 12 can be called a first handle 12, and a second handle 40 is provided which is attached by a pivot pin 44 to the movable jaw 30, the second handle 40 extending rearwardly in a conventional manner.

A toggle link 46 is pivotally attached to the second handle 40 by means of a pivot pin 50 at the forward end of the toggle link 46. The toggle link has a rearward end extending away from the jaws 20 and 30, and the rearward end of the toggle link 46 is connected by a pivot pin 48 to a first wedge 60 of a pair of co-acting wedges 60 and 62.

The wedges 60 and 62 are disposed between first and second surfaces 70 and 72 of said handle. The surfaces 70 and 72 are disposed one on the underside of the top of the wrench and the other on the upperside of a bottom piece 76 of the wrench handle. The surface 72 is disposed opposite and spaced from the surface 70. The first and second surfaces 70 and 72 are substantially parallel both to each other and to the length of the handle 12. First and second movable wedges 60 and 62 each have one end of greater width than the other end as seen in side elevation. The forward end of the first wedge 60 is the end of greatest width and the rearward end of the second wedge 62 is of greater width than its forward end.

The wedges 60 and 62 are arranged with the wide end of one disposed toward the jaw end of the wrench and the wide end of the other disposed away from the jaw end of the wrench. Particularly, the wide end of the first wedge 60 is disposed toward the jaw end of the wrench, and the wide end of the second wedge 62 is disposed away from the jaw end of the wrench.

Figures 4, 5, 6:
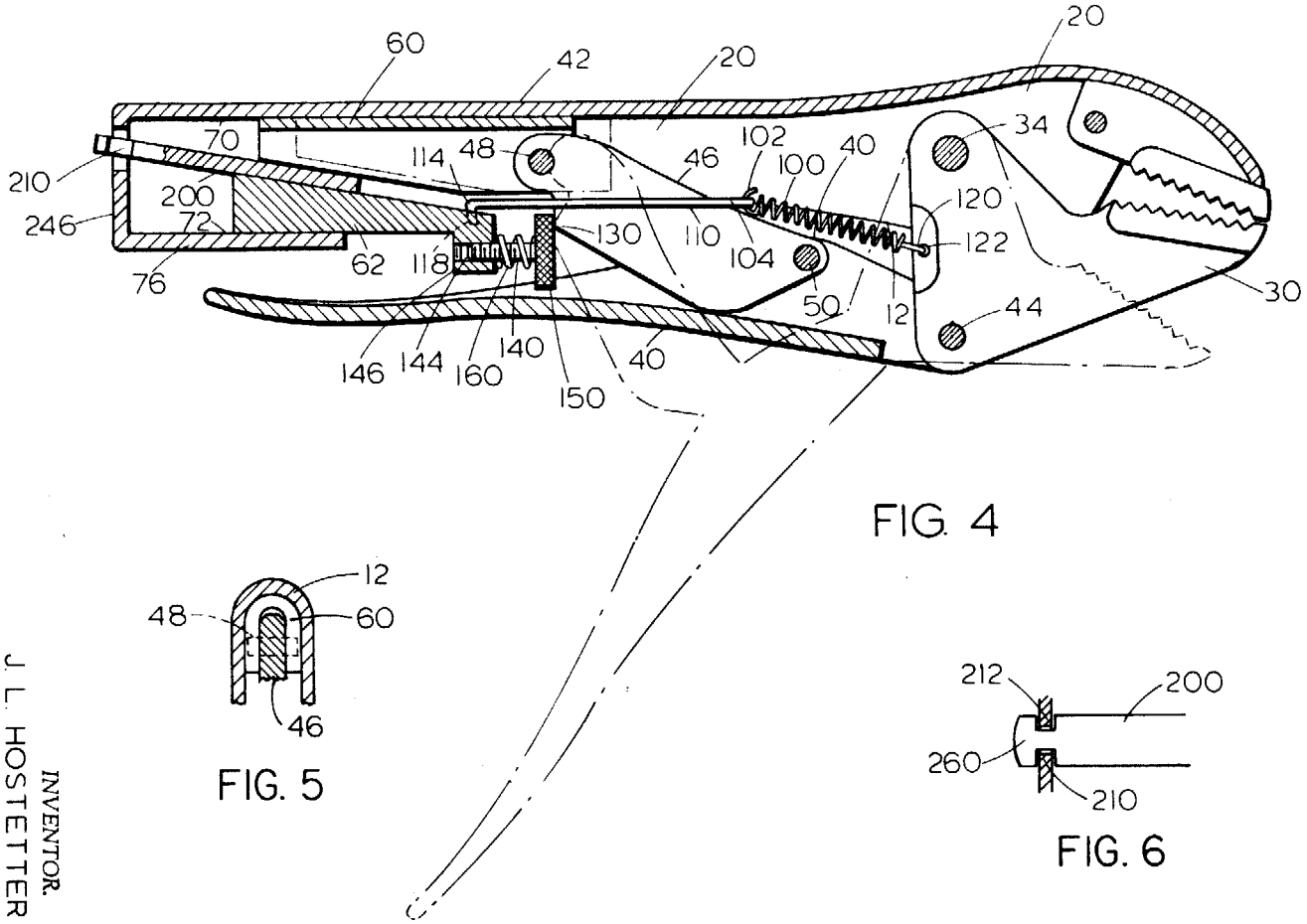
FIGURE 4 is a sectional view taken along the line 4—4 of FIGURE 2, an open position of parts being shown in dotted lines.
FIGURE 5 is a forward end view of the first wedge with broken away portion of a toggle link attached thereto, and showing adjacent portions of the stationary handle in section.
FIGURE 6 is a top plan view of a separation plate of this invention shown with adjacent portions of the end of the handle of the wrench.

Referring to FIGURE 4, it will be seen that resilient means such as preferably a tension spring 100 is provided in a position preferably disposed forwardly of the toggle link 46, with its rearward end having a hook 102 received in an eye 104 in the forward end of a connector 110 which latter extends rearwardly to the second wedge 62 and is there down-turned into a vertical portion 114 which is received in a recess 118 in the second wedge 62 whereby the spring is thereby attached to the second wedge 62.

The forward end of the spring 100 has a hook 120 which is connected to a hole 122 in the rearward side of the lower jaw 30 whereby the spring 100 exerts a constant forward pull on the second wedge 62 because of the anchoring of the forward end of the spring 100 to a suitable part of the wrench such as, for example, the jaw opening 122.

Also as best seen in FIGURE 4, the toggle link 46 has a rearwardly facing shoulder 130 thereon.

The second wedge 62 has means on its forward end for engaging the shoulder 130, such means preferably is a screw 140 threadedly received in a threaded forward to rearward extending bore 144 on the downwardly projecting portion 146 of the second wedge 62.

The screw 140 has a head 150 the forward side of which is transversely disposed with respect to the length of the handle 12 and normal thereto, and is an engagement with the shoulder 130 most of the time.

A compression spring 160 is on the screw 140 between the head 150 and the forward side of the protrusion 146 of the second wedge 62 for preventing the screw 150 from vibrating out of adjustment.

A separation plate 200 is disposed between the wedges 60 and 62 and has a rearward end anchored to the handle 12 whereby the plate 200 is in a relatively fixed position and prevents a rearward motion of the first wedge 60 from causing a corresponding rearward motion of the second wedge 62 by maintaining the wedges out of frictional engagement.

The separation plate has parallel planar upper and lower surfaces and its rearward end has a notch 210 disposed slightly inwardly from the rearwardmost tip thereof. The notch 210 enters from the right side of the separation plate 200 as shown in FIGURE 5, and the corresponding notch 212 enters from the left side of the separation plate 200.

The width of the plate 200 as seen in top plan view at a point between the notches 210 and 212 is sufficiently narrow as to be receivable between the sides 220 and 240 of an opening generally indicated at 242 which extends through a rearward end wall 246 of the handle 12.

It will be seen that the separation plate 200 is wider than the width of the opening 242 on both the forward and rearward sides of the notches 210 and 212 so that in manufacture the separation plate is easily assembled into place by inserting its rearward end portion 260 through the opening 242, the height of the opening 242 being enough to permit this, and then turning the separation plate into the position shown in FIGURE 4, thereby locking it against forward and rearward motion.

In operation, it will be seen that upon a movement of the second or movable handle 40 toward the first handle 12, the first wedge 60 will be moved rearwardly by the link 46 to an extent proportional to the size of a workpiece engaged between the jaws, and not shown, this action continuing until the wedges 60 and 62 jam against the separation plate 200 and against the first and second surfaces 70 and 72 of the first handle 12, whereby they are set.

After the wedges 60 and 62 are set, a fixed position of the pivotal connection 48 of the rearward end of the link 46 and the first wedge 60 is established, whereby a still further movement of the second or movable handle 40 toward the first or stationary handle 12 will cause the movable jaw 30 to be urged toward the stationary jaw 20 still further thereby causing a clamping pressure on a workpiece disposed between the jaws.

As best seen in FIGURE 4, an adjustment of the screw 140 forwardly will cause the clamping pressure to be less, and an adjustment of the pressure adjusting screw 140 rearwardly will cause the clamping pressure to be greater.

This is because, when the screw 104 is farther forward, the wedge 62 will be held in a further rearward position with respect to the handle 12 and with respect to the surfaces 70 and 72 whereby the wedges 60 and 62 will tend to jam or set in a further rearward position with respect to a workpiece of a given size than they would if the screw 140 were in a more rearward position.

When the wedges 60 and 62 correspondingly set at a further rearward position, the pivot pin 48 is thereby in a further rearward position, causing a lesser amount of movement of parts to occur after the setting of the wedges whereby the amount of clamping motion is less and the amount of clamping pressure is less. The converse is also true causing a greater amount of clamping pressure.

The self-adjusting wrench above described is believed to fulfill the objects above set forth providing a more efficient and less expensive tool.

From the foregoing description, it is thought to be obvious that a self-adjusting plier-type toggle locking wrench constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. In a wrench, the combination of an elongated first handle forming a body portion provided at one end with a stationary jaw and formed with an elongated recess, a co-acting movable jaw pivoted to said body, a second handle pivoted to said movable jaw, a toggle link pivotally attached to said second handle and extending away from said jaws and toward the farther end of said recess, a section of said handle portion which is spaced a substantial distance from said jaws being provided with a hollow portion having first and second spaced apart surfaces disposed opposite each other and extending generally linearly of said handle, said first and second surfaces being substantially parallel both to each other and to the length of said first handle, first and second wedges disposed between said first and second surfaces, said wedges each having one end of greater width than the other end as seen in side elevation, said wedges being arranged with the wide end of one disposed toward the jaw end of said wrench and the wide end of the other disposed away from the jaw end of the wrench, said toggle link being pivotally connected at its rearward end to a first one of said wedges, resilient means positioned in said wrench such that said resilient means urges said second wedge forwardly toward said jaws, said toggle link having a rearwardly facing shoulder thereon, means on the forward end of said second wedge for engaging said shoulder to force said second wedge rearwardly as the rearward end of said toggle link moves rearwardly upon a movement of said second handle toward said first mentioned handle and a separation plate disposed between said wedges and anchored to said first mentioned handle to prevent a rearward motion of said first wedge from causing a rearward motion of said second wedge by maintaining said wedges out of frictional engagement whereby upon a movement of said second handle toward said first handle said first wedge is moved rearwardly by said link to an extent proportional to the size of a workpiece engaged between said jaws until said wedges jam against said separation plate and against the said first and second surfaces of said first handle so that they are set, and whereby after said wedges are set a fixed position of the pivotal connection of the rearward end of said link is established, whereby still further movement of said second handle toward said first handle will cause said movable jaw to be urged toward said stationary jaw still further thereby causing a clamping pressure on said workpiece.

2. The combination of claim 1 in which said first handle has a rearward wall provided with an opening therethrough, and in which said pressure plate is of a lesser width at a point spaced a short distance forwardly of its rearward end, and whereby the said opening in said rearward wall is of a size for receiving the rearwardmost portion of said pressure plate therethrough at times when said pressure plate is in a position with its width disposed upwardly and downwardly and said opening is of a size such that its width is of a lesser size than the width of the rearwardmost portion of said pressure plate at times when said pressure plate is disposed in a normal position with its width extending from side to side, whereby said pressure plate can be assembled to said first handle by inserting it into that opening until its portion of lesser width is adjacent said opening, then rotating said pressure plate ninety degrees until it is in the said normal position whereupon the pressure plate cannot move forwardly to any substantial distance, and whereby that portion of said pressure plate which is disposed immediately forwardly of said rearward wall of said handle is disposed of a greater width than the width of said opening whereby said pressure plate cannot move rearwardly to a substantial extent.

3. The combination of claim 2 in which a member adjustably attached to said second wedge is located at the forward edge of said second wedge for engaging said shoulder, said member having a forward surface adapted to be engaged with said rearwardly facing shoulder of said link so as to adjustably position said second wedge with respect to said shoulder to adjust the effective clamping pressure of said wrench on a work piece.

4. The combination of claim 3 in which said pressure adjusting member is a screw threadedly received in said second wedge.

*5. In a wrench, the combination of an elongated first handle forming a body portion provided at one end with a stationary jaw and formed with an elongated recess, a co-acting movable jaw pivoted to said body, a second handle pivoted to said movable jaw, a toggle link pivotally attached to said second handle and extending away from said jaws and toward the farther end of said recess, a section of said handle portion which is spaced a substantial distance from said jaws being provided with a hollow portion having first and second spaced apart surfaces disposed opposite each other and extending generally linearly of said handle, said first and second surfaces being substantially parallel both to each other and to the length of said first handle, first and second wedges disposed between said first and second surfaces, said wedges each having one end of greater width than the other end as seen in side elevation, said wedges being arranged with the wide end of one disposed toward the jaw end of said wrench and the wide end of the other disposed away from the jaw end of the wrench, said toggle link being pivotally connected at its rearward end to a first one of said wedges, resilient means positioned in said wrench such that said resilient means urges said second wedge forwardly toward said jaws, said toggle link having a rearwardly facing shoulder thereon, means on the forward end of said second wedge for engaging said shoulder to force said second wedge rearwardly as the rearward end of said toggle link moves rearwardly upon a movement of said second handle toward said first mentioned handle, and free-floating separation means disposed between said wedges, said separation means limited in movement longitudinally of said first handle by the rear end of said first handle and the rear end of said resilient means, said separation means operable to prevent a rearward motion of said first wedge from causing a rearward motion of said second wedge by maintaining said wedges out of frictional engagement whereby upon a movement of said second handle toward said first handle said first wedge is moved rearwardly by said link to an extent proportional to the size of a work piece engaged between said jaws until said wedges jam against said separation means and against the said first and second surfaces of said first handle so that they are set, and whereby after said wedges are set a fixed position of the pivotal connection of the rearward end of said link is established, whereby still further movement of said second handle toward said first handle will cause said movable jaw to be urged toward said stationary jaw still further thereby causing a clamping pressure on said work piece.*

*6. In a wrench, the combination of an elongated first handle forming a body portion provided at one end with a stationary jaw and formed with an elongated recess, a co-acting movable jaw pivoted to said body, a second handle pivoted to said movable jaw, a toggle link pivotally attached to said second handle and extending away from said jaws and toward the farther end of said recess, a section of said handle portion which is spaced a substantial distance from said jaws being provided with a hollow portion having first and second spaced apart surfaces disposed opposite each other and extending generally linearly of said handle, said first and second surfaces being substantially parallel both to each other and to the length of said first handle, first and second wedges disposed between said first and second surfaces, said wedges each having one end of greater width than the other end as seen in side elevation, said wedges being arranged with the wide end of one disposed toward the jaw end of said wrench and the wide end of the other disposed away from the jaw end of the wrench, said toggle link being pivotally connected at its rearward end to a first one of said wedges, resilient means positioned in said wrench such that said resilient means urges said second wedge forwardly toward said jaws, said toggle link having a rearwardly facing shoulder thereon, means on the forward end of said second wedge for engaging said shoulder to force said second wedge rearwardly as the rearward end of said toggle link moves rearwardly upon a movement of said second handle toward said first mentioned handle, and free-floating separation means connected to said first handle and disposed between said wedges to prevent a rearward motion of said first wedge from causing a rearward motion of said second wedge by maintaining said wedges out of frictional engagement whereby upon a movement of said second handle toward said first handle said first wedge is moved rearwardly by said link to an extent proportional to the size of a work piece engaged between said jaws until said wedges jam against said separation means and against the said first and second surfaces of said first handle so that they are set, and whereby after said wedges are set a fixed position of the pivotal connection of the rearward end of said link is established, whereby still further movement of said second handle toward said first handle will cause said movable jaw to be urged toward said stationary jaw still further thereby causing a clamping pressure on said work piece.*

*7. In a wrench, the combination of an elongated first handle forming a body portion provided at one end with a stationary jaw and formed with an elongated recess, a co-acting movable jaw pivoted to said body, a second handle pivoted to said movable jaw, a toggle link pivotally attached to said second handle and extending away from said jaws and toward the farther end of said recess, a section of said handle portion which is spaced a substantial distance from said jaws being provided with a hollow portion having first and second spaced apart surfaces disposed opposite each other and extending generally linearly of said handle, said first and second surfaces being substantially parallel both to each other and to the length of said first handle, first and second wedges disposed between said first and second surfaces, said wedges each having one end of greater width than the other end as seen in side elevation, said wedges being arranged with the wide end of one disposed toward the jaw end of said wrench and the wide end of the other disposed away from the jaw end of the wrench, said toggle link being pivotally connected at its rearward end to*

*a first one of said wedges, resilient means positioned in said wrench such that said resilient means urges said second wedge forwardly toward said jaws, said toggle link having a rearwardly facing shoulder thereon, means on the forward end of said second wedge for engaging said shoulder to force said second wedge rearwardly as the rearward end of said toggle link moves rearwardly upon a movement of said second handle toward said first mentioned handle, and separation means disposed between said wedges comprising a plate having parallel planar upper and lower surfaces, said separation means operable to prevent a rearward motion of said first wedge from causing a rearward motion of said second wedge by maintaining said wedges out of frictional engagement whereby upon a movement of said second handle toward said first handle said first wedge is moved rearwardly by said link to an extent proportional to the size of a work piece engaged between said jaws until said wedges jam against said separation means and against the said first and second surfaces of said first handle so that they are set, and*

*whereby after said wedges are set a fixed position of the pivotal connection of the rearward end of said link is established, whereby still further movement of said second handle toward said first handle will cause said movable jaw to be urged toward said stationary jaw still further thereby causing a clamping pressure on said work piece.*

References Cited

The following references, cited by the Examiner, are of record in the patented file of this patent or the original patent.

UNITED STATES PATENTS

| | | |
|---|---|---|
| 2,531,285 | 11/1950 | Manspeaker. |
| 2,751,801 | 6/1956 | Hostetter. |

FOREIGN PATENTS

| | | |
|---|---|---|
| 642,102 | 6/1962 | Canada. |
| 1,236,863 | 6/1960 | France. |

MILTON S. MEHR, *Primary Examiner.*